No. 811,170. PATENTED JAN. 30, 1906.
D. W. PAYNE.
PASTEURIZER OR COOLER.
APPLICATION FILED FEB. 21, 1905.
2 SHEETS—SHEET 1.
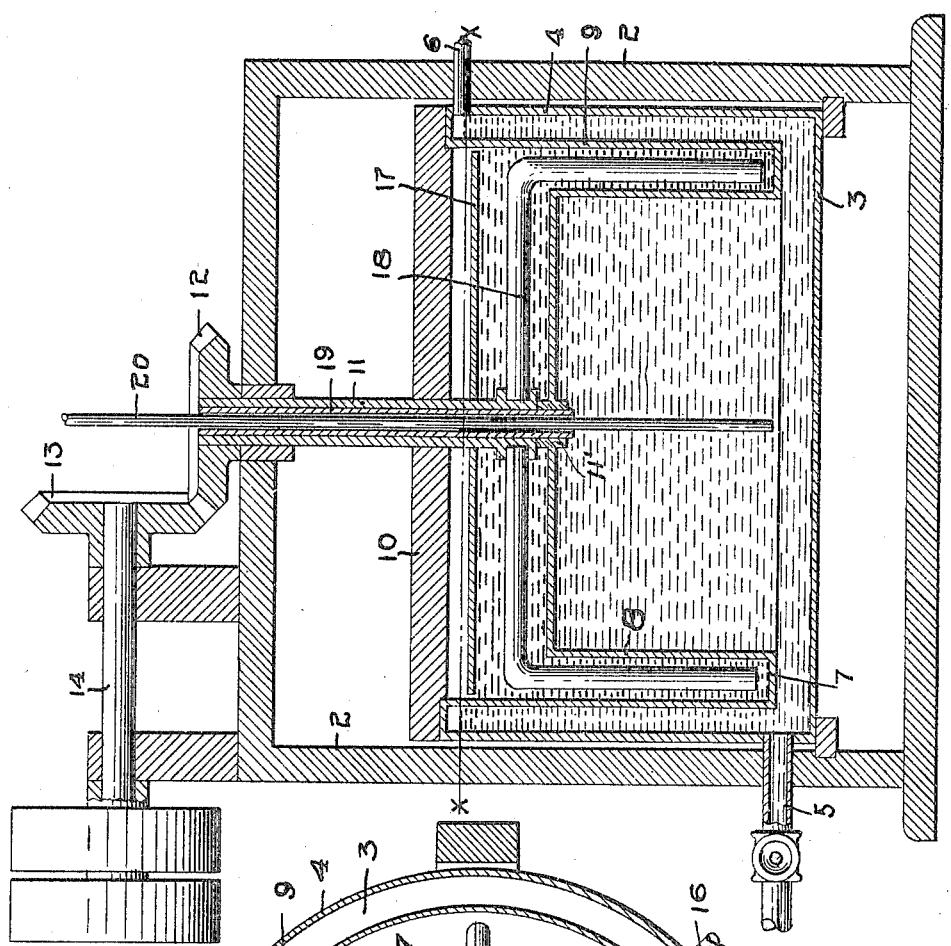
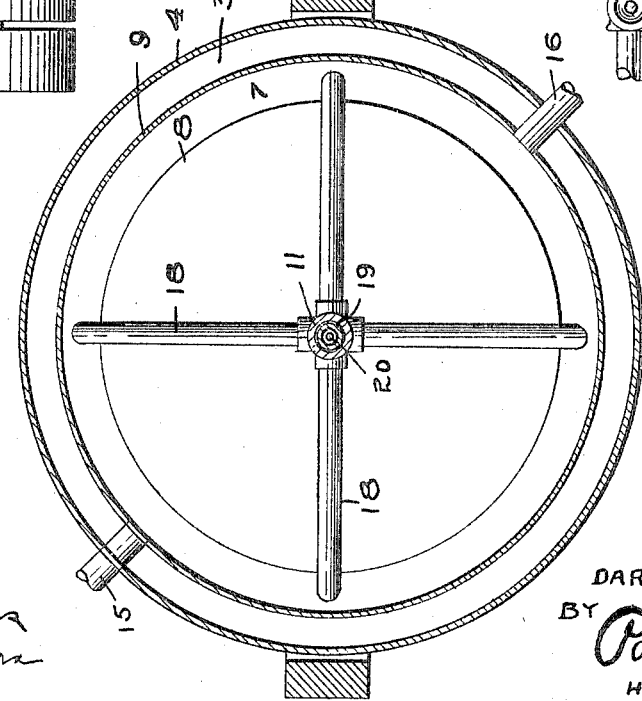
WITNESSES
INVENTOR
DARIUS W. PAYNE
BY
Paul & Paul
HIS ATTORNEYS No. 811,170. PATENTED JAN. 30, 1906.
D. W. PAYNE.
PASTEURIZER OR COOLER.
APPLICATION FILED FEB. 21, 1905.
2 SHEETS—SHEET 2.
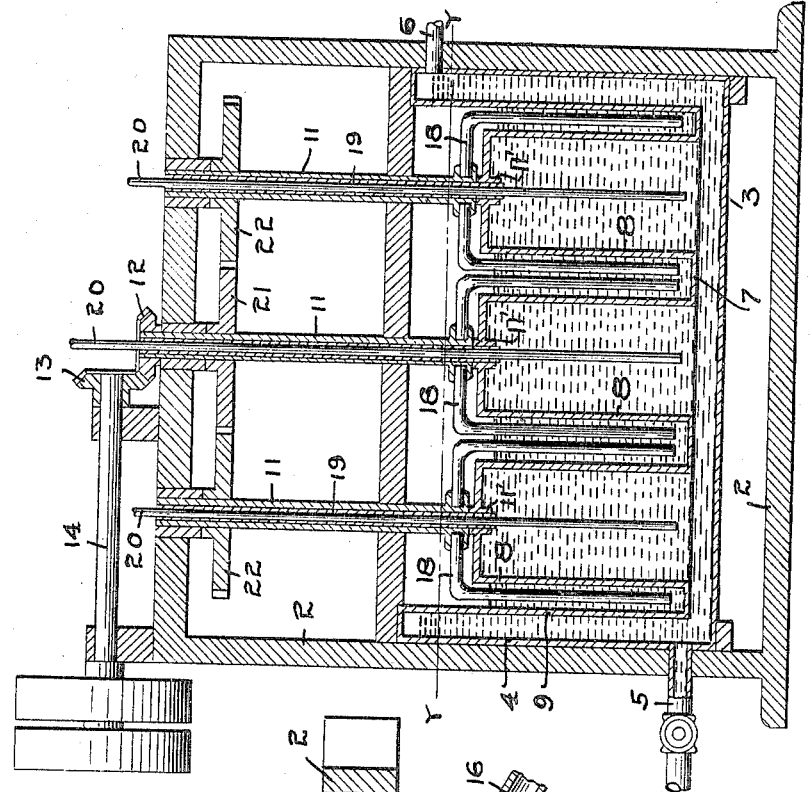
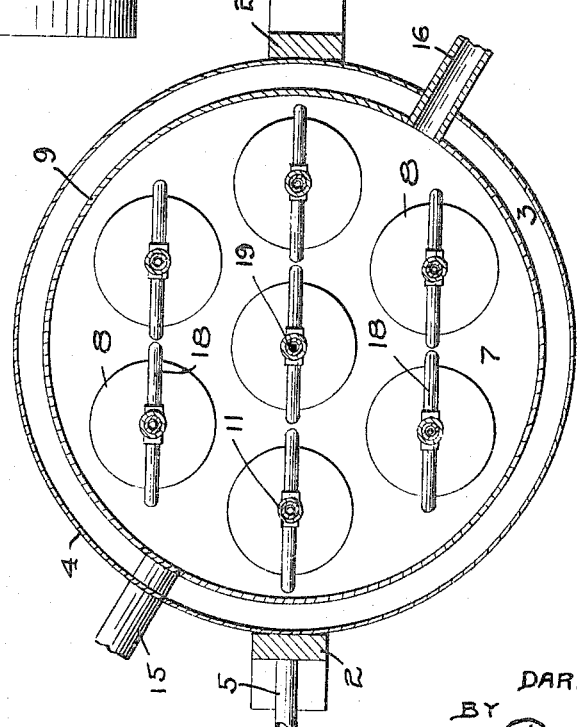
WITNESSES
INVENTOR
DARIUS W. PAYNE
BY
Paul & Paul
HIS ATTORNEYS ated in Pasteurizers or Coolers, of
UNITED STATES PATENT OFFICE.

DARIUS W. PAYNE, OF MINNEAPOLIS, MINNESOTA.

PASTEURIZER OR COOLER.

No. 811,170. Specification of Letters Patent. Patented Jan. 30, 1906.

Application filed February 21, 1905. Serial No. 246,667.

*To all whom it may concern:*

Be it known that I, DARIUS W. PAYNE, of Minneapolis, Hennepin county, Minnesota, have invented certain new and useful Improvements in Pasteurizers or Coolers, of which the following is a specification.

My invention relates to an apparatus for pasteurizing or cooling cream or other liquids; and the object of the invention is to provide a machine for this purpose of large capacity and great efficiency.

A further object is to provide a machine of simple construction and one that is easily operated and controlled.

Other objects of the invention will appear from the following detailed description.

The invention consists generally in various constructions and combinations, all as hereinafter described, and particularly pointed out in the claims.

In the accompanying drawings, forming part of this specification, Figure 1 is a vertical section of a pasteurizer or cooler embodying my invention. Fig. 2 is a horizontal section on the line $x\,x$ of Fig. 1. Fig. 3 is a vertical section showing an apparatus of the same type as shown in Fig. 1, but of greater capacity. Fig. 4 is a horizontal section on the line $y\,y$ of Fig. 3.

In the drawings, 2 represents a suitable frame of wood, metal, or other suitable material, wherein the pasteurizing or cooling apparatus is arranged.

3 represents the outer bottom of a water-tank having side walls 4, preferably circular in form and provided with an intake-pipe 5 and an exhaust-pipe 6 for the water and steam. A second wall for the tank is arranged within the first one, having its bottom 7 provided with a circular raised central portion 8 and side walls 9, that are spaced from the walls 4 and from the bottom 3 and are preferably joined to the walls 4 at the top of the tank, thereby closing the space between the outer and inner walls. The space or chamber formed between the double walls of the tank constitutes a water or steam receptacle that acts as a cooling or heating jacket around the body of cream to properly reduce the temperature thereof or to raise it for the purpose of pasteurization. A cover 10 is arranged upon the upper edge of the tank within the casing 2, and a sleeve 11 has a bearing on a hub 11' in the raised portion 8 and is provided at its upper end with a gear 12, meshing with a similar gear 13 on a drive-shaft 14. A space is provided between the central portion 8 and the wall 9, and the double walls of the tank preferably extend above the level of said central portion, and within the space inclosed by said double wall the body of cream is contained, being fed into said space through the pipe 15 at the bottom and allowed to discharge through the corresponding pipe 16 near the top of the tank. A loose or floating cover 17 is provided on the sleeve 11 below the cover 10 to rest upon the body of cream and prevent it from collecting in the top of the tank out of the path of the agitators. Near the lower end of the sleeve 11 I provide angled arms or agitators 18, that extend across the top of the raised portion 8 and depend within the space between said raised portion and the wall 9. As many of these arms may be provided as seems necessary or desirable; but I have shown four in this instance, each arm acting as an agitator to stir the cream or other liquid and keep it in motion and present it to the cooling or heating surface of the inner wall, said surface being greatly increased in area by providing the central raised portion. When the apparatus is used as a cooler, the water circulating through the space between the double walls of the tank will keep the inner wall cool and quickly reduce the temperature of the cream or other liquid inclosed by the said wall. A fixed ventilating-pipe 19 fits within the sleeve 11 and is secured at its lower end in the hub 11' and allows the escape of air from the space inclosed by said raised portion when the said space is filled with water. This pipe will also exhaust any steam that may accumulate within said space.

It is sometimes desirable to use the apparatus as a pasteurizer, in which case a steam-pipe 20 is inserted through the pipe 19 for the purpose of conducting steam into the space between the inner and outer walls of the tank, thereby heating the water and raising the temperature of the cream or other liquid sufficiently to destroy all bacteria. Whenever desired, the pipe 20 may be utilized to deliver water to the tank instead of cream.

In Figs. 3 and 4 I have shown a slight modification of the apparatus, which consists, however, in merely multiplying the number of raised portions on the inner wall of the tank and providing a number of sets of agitating-arms instead of one series. The tank construction is substantially the same as the one described, and the manner of mounting the arms is therefore the same, and I will therefore use the same reference-figures as heretofore employed in designating the respective parts. To drive the various sets of arms, I provide a gear 21 on the central sleeve, meshing with similar gears 22 on the contiguous sleeves, whereby said sleeves and agitating-arms will be driven simultaneously. It will be noted, however, that the gears on opposite sides of the central one will be moved in opposite directions and an increased agitation of the cream will result.

The apparatus shown in Figs. 3 and 4 has a much larger capacity than the one in Fig. 1, as the cooling or pasteurizing surface of the tank is very much increased in area by the employment of a series of raised portions on the inner wall instead of a single one.

I do not wish to confine myself to any particular size or number of these raised portions, there being a series of them grouped around the central one and each having agitating-arms geared to the driving mechanism of the central arms.

I claim as my invention—

1. A tank having an inner and outer wall with a space between them, and inlet and exhaust pipes communicating with said space, the bottom of the inner wall having a raised central portion that is spaced from the sides of said inner wall, the space inclosed by said inner wall forming a cream-receptacle, a pipe centrally mounted on said raised portion, a revolving sleeve inclosing said pipe and provided with stirring-arms operating between the said raised portion and the said inner wall.

2. A tank having an inner and outer wall with a space between them, and inlet and exhaust pipes communicating with said space, the bottom of the inner wall having a series of raised portions that are spaced from one another and from the sides of said inner wall, the space inclosed by said inner wall around said raised portions forming a cream-receptacle and having cream inlet and discharge pipes, and a series of stirring-arms operating between said raised portions and in the space between said raised portions and the sides of said inner wall.

3. A tank having an inner and outer wall with a space between them, and water and steam inlet and exhaust pipes communicating with said space, the bottom of the inner wall having a series of raised portions there being one in the center with the others at regular intervals around it, the space inclosed by said inner wall forming a cream-receptacle and having cream inlet and discharge pipes, stirring-arms depending within the space around said central raised portion, a gear mechanism for driving the same, a series of other stirring-arms depending within the space around said other raised portions and operatively connected with the driving mechanism for said first-named stirring-arms whereby all of them will be operated simultaneously, substantially as described.

4. An apparatus for pasteurizing cream comprising a tank having an inner and outer wall with a space between them, and an exhaust-pipe communicating with said space, the bottom of said inner wall having a raised central portion that is spaced from the sides of said inner wall, the space inclosed by said inner wall forming a cream-receptacle, a pipe rigidly connected concentrically to the said raised central portion, a sleeve surrounding the said pipe provided with a bevel-gear on its upper end and at its lower end having stirring-arms depending within the space between the said raised portion and the sides of the said inner wall, and a driving-shaft arranged above the said tank and provided with a bevel-gear meshing with the bevel-gear on the said sleeve.

5. An apparatus for pasteurizing cream comprising a tank having an inner and outer wall with a space between them, and an exhaust-pipe communicating with said space, the bottom of said inner wall having a raised central portion that is spaced from the sides of said inner wall, the space inclosed by said inner wall forming a cream-receptacle, a revolving sleeve vertically arranged above said raised portion centrally with respect thereto, a series of angled stirring-arms or agitators carried by said sleeve and extending across the top of said raised portion and depending within the space between said raised portion and the sides of said inner wall.

6. A tank having an inner and outer wall with a space between them, and inlet and exhaust pipes communicating with said space, the bottom of the inner wall having a series of raised portions that are spaced from one another and from the sides of said inner wall, the space inclosed by said inner wall around said raised portions forming a cream-receptacle and having cream inlet and discharge pipes, a series of pipes connected centrally to the said raised portions, and a series of revolving sleeves surrounding the said pipes and provided with stirring-arms operating in the spaces between the said raised portions and the said inner walls.

7. A tank having an inner and outer wall with a space between them, and inlet and exhaust pipes communicating with said space, the bottom of the inner wall having a raised central portion that is spaced from the sides of said inner wall, the space inclosed by said inner wall forming a cream-receptacle, a pipe secured to the top of said central portion and forming a tight joint therewith, and stirring-arms revolving around said pipe in the space between said raised central portion and said inner wall, substantially as described.

8. A tank having an inner and outer wall with a space between them and inlet and exhaust pipes communicating with said space, the bottom of the inner wall having a raised stationary central portion that is spaced from the sides of said inner wall, the space inclosed by said inner wall forming a cream-receptacle, a vent-pipe leading into the space inclosed by said raised central portion and stirring-arms operating in the space between said raised portion and the sides of said inner wall.

9. A tank having an inner and outer wall with a space between them, and inlet and exhaust pipes communicating with said space, the bottom of said inner wall having a raised portion that is spaced from the sides of said inner wall, the space inclosed by said inner wall forming a cream-receptacle, a steam-pipe communicating with the space inclosed by said raised portion, and stirring-arms operating in the space between said raised portion and the sides of said inner wall.

10. A tank having an inner and outer wall with a space between them, and inlet and exhaust pipes communicating with said space, the bottom of said inner wall having a series of raised portions that are spaced from the sides of said inner wall, the space inclosed by said inner wall forming a cream-receptacle, pipes communicating with the space inclosed by said raised portions, and stirring-arms operating in the space between said raised portions and the sides of said inner wall, substantially as described.

11. An apparatus for pasteurizing cream comprising a tank having an inner and outer wall with a space between them, and an exhaust-pipe communicating with said space, the bottom of said inner wall having a raised central portion spaced from the sides of said inner wall, the space inclosed by said inner wall forming a cream-receptacle, a pipe secured centrally to said raised portion, stirring-arms arranged to revolve around said pipe, and a steam-pipe fitting within said first-named pipe and leading into the space inclosed by said raised portion, substantially as described.

In witness whereof I have hereunto set my hand this 18th day of February, 1905.

DARIUS W. PAYNE.

Witnesses:
RICHARD PAUL,
C. MACNAMARA.